United States Patent [19]

Sharma et al.

[11] Patent Number: 6,097,728
[45] Date of Patent: *Aug. 1, 2000

[54] PERIODIC VERIFICATION OF MANUALLY PROVISIONED IS-IS ROUTING DATA

[75] Inventors: Sandeep Sharma, Raleigh, N.C.; Mario Huterer, Monza; Luca Ambrosoli, Milan, both of Italy; Lothar Burger, Stuttgart, Germany

[73] Assignee: Alcatel, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/934,955

[22] Filed: Sep. 22, 1997

[51] Int. Cl.[7] .......................... G06F 15/173; H04L 12/28; H04L 12/56

[52] U.S. Cl. ........................... 370/400; 370/258; 709/224

[58] Field of Search ...................................... 370/254, 255, 370/258, 351, 222, 245, 400, 452, 404, 406; 340/825.02, 825.05, 825.16, 825.52; 709/223, 224

[56] References Cited

U.S. PATENT DOCUMENTS 5,539,881 7/1996 Hunt et al. ........................... 395/200.2

Primary Examiner—Huy D. Vu
Assistant Examiner—Kevin C. Harper
Attorney, Agent, or Firm—Ware, Fressola, Van Der Sluys & Adolphson LLP

[57] ABSTRACT

The present invention provides a network element of a first type for operating in a network including other network elements of such first type and for allowing the other network elements to form part of the network that are not of the first type. Each of the first type of network element has the ability to automatically determine the topology of the network for each network element of such first type and further has the ability to store manually provisioned routing information about the network elements not of the first type when the network elements not of the first type are in the path to a network element of the first type. Each network element of the first type further comprises a circuit for periodically checking the validity of manually provisioned routing information.

17 Claims, 3 Drawing Sheets

RING NETWORK WITH ISIS AND non-ISIS NEs

PERIODIC VERIFICATION OF MANUALLY PROVISIONED IS-IS ROUTING DATA

BACKGROUND OF THE INVENTION

1. Field of the Invention

The present invention relates generally to a network using an Intermediate System to Intermediate System (IS—IS) protocol for connecting in a ring network; and more particularly, to a network element in such a network using the IS—IS protocol for connecting in such a ring network which may have at least one network element not using the IS—IS protocol.

2. Description of the Prior Art

The International Standards Organization (ISO) 10589 standard introduces the IS—IS protocol, which is planned for use in many network products worldwide. The IS—IS protocol gives a Network Element (NE) an automatic method of discovering the topology of a network. This automatic discovery, however, is restricted to NEs which support an IS—IS routing protocol. In order to know about NEs which do not support the IS—IS routing protocol, the IS—IS protocol allows end-users to manually provision information about these NEs.

For example, FIG. 1 shows a network having a first group with NEs 1, 2, and 10 that know about each other, and having a second group with NEs 5, 6 and 7 that know about each other (since they support IS—IS). However, the first and second groups of NEs do not know about the other group since they are connected to each other through NEs 3, 4, 8 and 9, which do not support the IS—IS routing protocol. To circumvent this problem, the IS—IS routing protocol allows manual information to be provisioned to NEs 2 and 10 about NEs 5, 6 and 7. The manual information also gets automatically propagated to NE 1. Similarly, NEs 7 and 5 can be provisioned with manual information about NEs 1, 2 and 10 (which gets distributed to NE 6 also). With the network provisioned in this manner, if NE 10 wants to send a packet to NE 6, it would know, via the manual information, that the way to get the packet there is by sending it to NE 9. NE 9 would send the packet to NE 8, which would send the packet to NE 7, and then from NE 7 to NE 6.

Now, if the link between NEs 8 and 9 were to break, NE 10 would not know about this, and for sending packets to NE 6, it would continue using the same route as before, even though this route is not valid anymore. Note that at this instant, there is an alternate route to NE 6, which NE 10 would not use since it thinks that the other route is better. The problem then is that since the IS—IS routing protocol does not have a mechanism for disabling/deleting invalid manual routing information, it can cause a lack of connectivity between two groups of NEs which could potentially still be connected.

This problem not only applies to link failures, but is applicable to network re-configuration situations also.

SUMMARY OF THE INVENTION

In its broadest sense, the invention provides a method and apparatus for recovering from incorrect manually provisioned information, which can potentially cause a lack of communication between NEs.

In particular, the present invention provides a network element of a first type for operating in a network including other network elements of such first type and for allowing the other network elements to form part of the network that are not of the first type. Each network element of the first type has the ability to automatically determine the topology of the network for each network element of such first type and further has the ability to store manually provisioned routing information about the network elements not of the first type when the network elements not of the first type are in the path to a network element of the first type. Each network element of the first type further comprises means for periodically checking the validity of manually provisioned routing information.

In one embodiment, the means for periodically checking the validity of manually provisioned routing information includes: (1) means for periodically generating a check signal to another network element of the first type that uses manually provisioned routing information to reach the another network element of the first type; (2) means for receiving an acknowledge signal from the another network element of the first type, and if the acknowledge signal is received, validating the manually provisioned routing information, and if the acknowledge signal is not received, invalidating the manually provisioned routing information; and (3) means for generating an acknowledge signal if the first type of network element receives a check signal from another network element of the first type, the acknowledge signal being directed to the network element that generates the check signal.

In the embodiment shown and described herein the network is a connectionless network (CLNP) and Intermediate System to Intermediate System (IS—IS), although the scope of the invention is not intended to be limited to only such a network.

In the embodiment shown and described herein the CLNP and IS—IS are part of an Open System Interconnection (OSI) stack, and the communication protocol is an IS—IS protocol, although the scope of the invention is not intended to be limited to only such a network, system or communication protocol.

In effect, the solution utilizes the OSI Ping function. The CLNP protocol along with the IS—IS protocol provides routing functionality for the OSI stack. To verify the reachability of NEs that are entered manually, the OSI Ping function provided by CLNP is used. The frequency of such checks can be a provisionable parameter.

The present invention also provides a method for periodically verifying the manually provisioned IS—IS routing data in the network having network elements using the IS—IS protocol and having at least one network element not using the IS—IS protocol for which manually provisioned IS—IS routing data is maintained by at least one network element using the IS—IS protocol.

The steps include the following: (a) starting a timer;

(b) checking if the timer has expired; (c) checking the reachability of manually provisioned IS—IS routing data; (d) if the manually provisioned IS—IS routing data is reachable, then marking the manually provisioned IS—IS routing data as reachable manually provisioned IS—IS routing data; and (e) if the manually provisioned IS—IS routing data is not reachable, then marking the manually provisioned IS—IS routing data as non-reachable manually provisioned IS—IS routing data.

In the method, steps (a) to (e) may be repeated for each manually provisioned IS—IS routing data.

In the method, step (e) may also include automatically deleting the manually provisioned IS—IS routing data if the manually provisioned IS—IS routing data is not reachable.

In the method, step (e) may also include raising an optional alarm for a management entity if the manually provisioned IS—IS routing data is not reachable.

One important advantage of the present invention over the prior art is that incorrect manually provisioned information—which can potentially cause a lack of communication between NEs—can be detected, and the routing of data between network elements in the network can be adjusted accordingly.

Other objects of the invention will in part be obvious and will in part appear hereinafter.

Accordingly, the invention comprises the features of construction, combination of elements, and arrangement of parts which will be exemplified in the construction hereinafter set forth, and the scope of the invention will be indicated in the claims.

BRIEF DESCRIPTION OF THE DRAWING

For a fuller understanding of the nature of the invention, reference should be made to the following detailed descriptions taken in connection with the accompanying drawings, not drawn to scale, in which.

BEST MODE FOR CARRYING OUT THE INVENTION

The basic idea of the present invention is to associate timers with manually provisioned information. Periodically, the validity of the manually provisioned information shall be checked automatically. If the information is invalid, it shall be deleted/disabled so that false routing does not take place. Thus, in FIG. 1, since manual information has been provisioned at NE 10, it can be periodically checked to determine the reachability of NE 7 from this NE (the choice of NE 7 is valid since the manual information has been entered to reach the next IS—IS compliant area). If NE 7 is unreachable, the provisioned manual information can be automatically disabled/deleted, and an optional alarm can be raised for the management entity. This solution could be implemented as part of the IS—IS protocol, which is unlikely since this protocol is normally ready for deployment. Instead, the solution can be implemented as a small protocol riding on top of the IS—IS protocol.

In its broadest sense, the present invention provides a network element of a first type for operating in a network including other network elements of such first type and for allowing the other network elements to form part of the network that are not of the first type. Each of the first type of network element has the ability to automatically determine the topology of the network for each network element of such first type and further has the ability to store manually provisioned routing information about the network elements not of the first type when the network elements not of the first type are in the path to a network element of the first type. Each network element of the first type further comprises means for periodically checking the validity of manually provisioned routing information.

Figure 1:
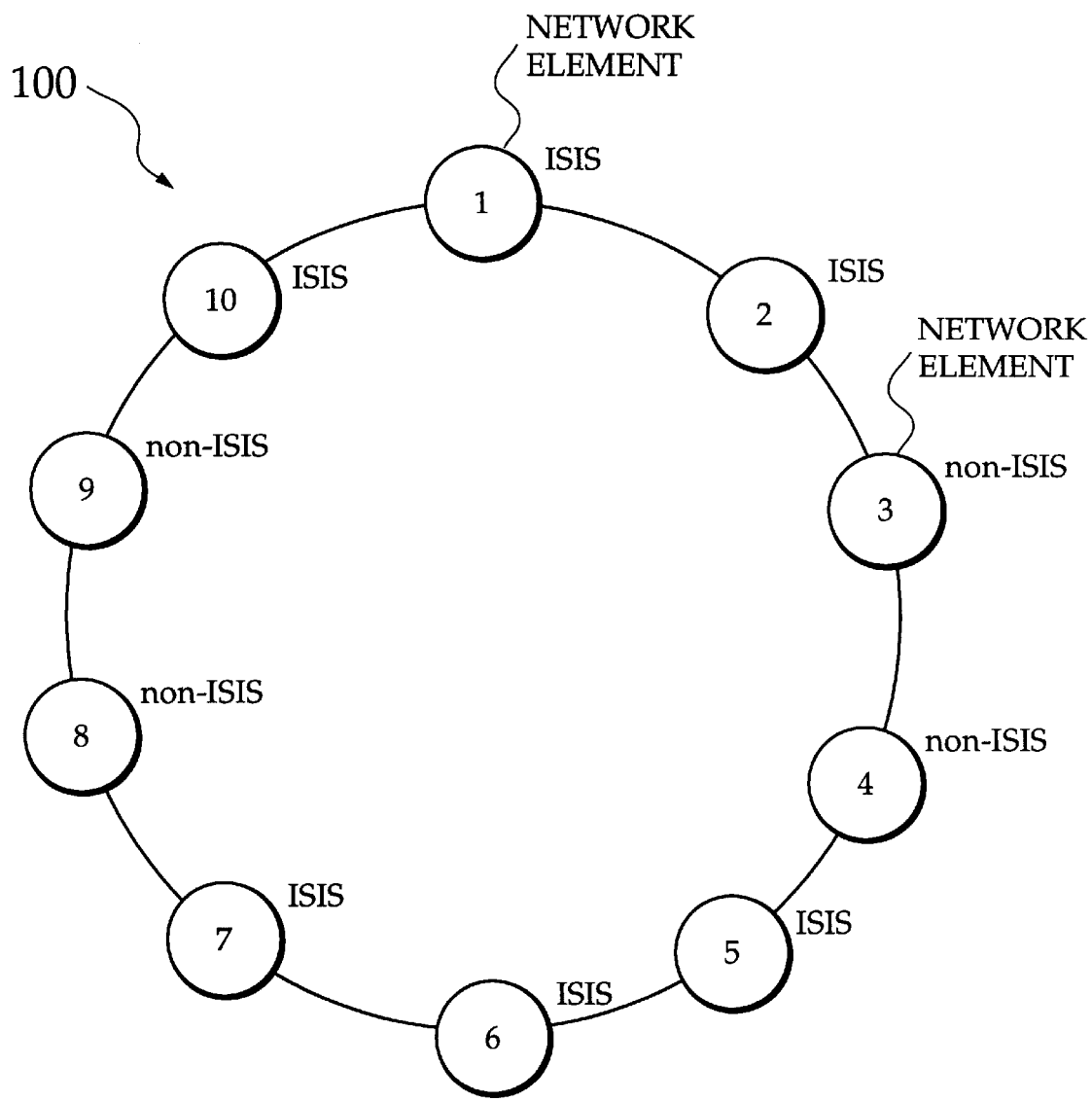
FIG. 1 is a diagram of a ring network with network elements using the IS—IS protocol and with at least one network element not using the IS—IS protocol.
Figure 2:
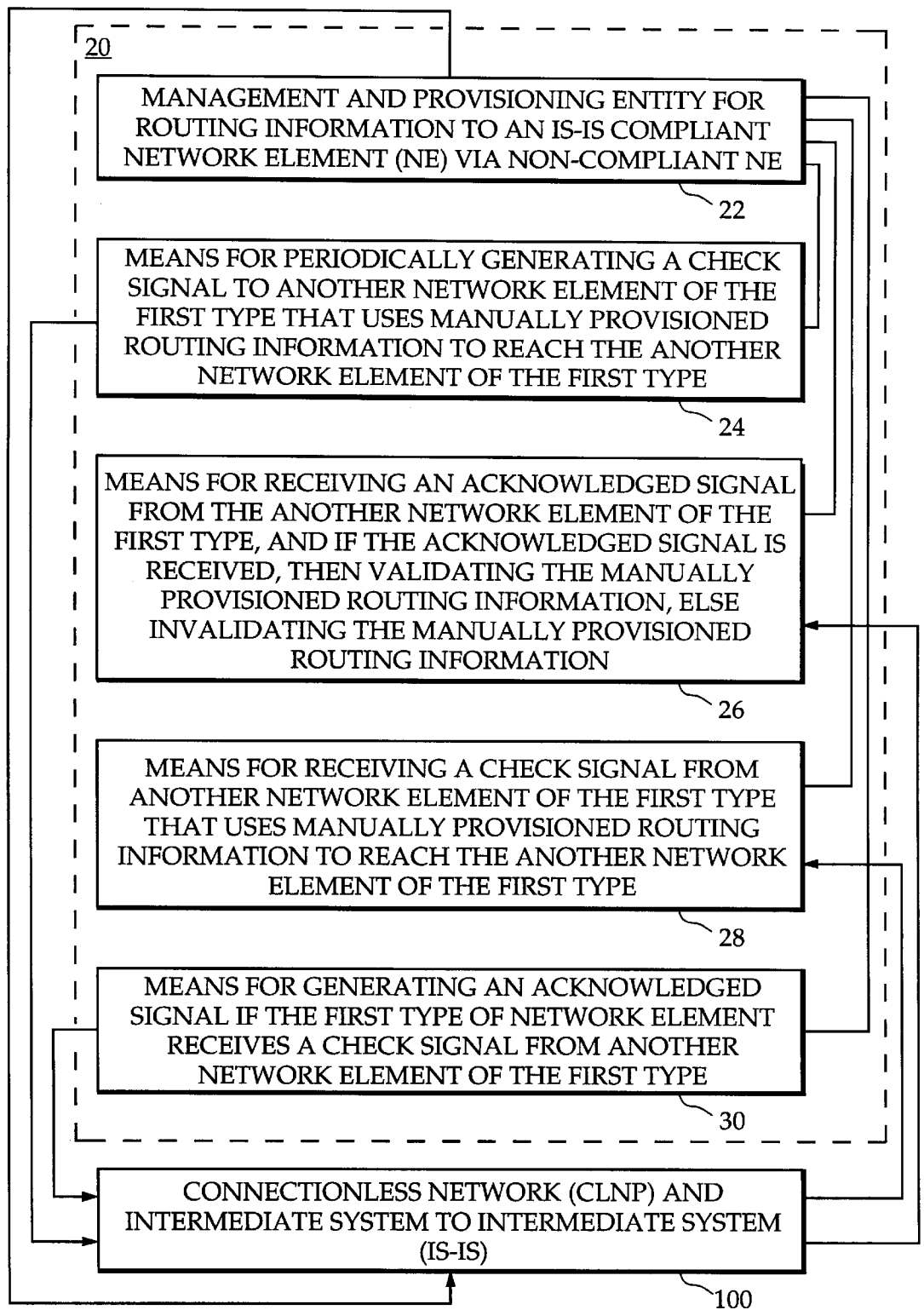
FIG. 2 is a block diagram of the network element.

FIG. 2 shows one embodiment of the means for periodically checking the validity of manually provisioned routing information for a network element of the first type, generally indicated as 20, operating in accordance with a communication protocol for connecting to a network, generally indicated as 100 in FIGS. 1 and 2. As discussed above, the network 100 has at least one other network element of the first type also operating in accordance with the communication protocol and has at least one network element of a second type not operating in accordance with the communication protocol. As also discussed above, in FIG. 1, the network element 20 of the first type operating in accordance with the IS—IS protocol may be any one of the network elements 1, 2, 5–7 and 10, while the network elements of the second type not operating in accordance with the IS—IS protocol may be any one of the network elements 3–4 and 8–9.

In FIG. 2, the network element 20 includes means, generally indicated as 22, for providing a manually provisioned communication protocol routing information signal containing the manually provisioned communication protocol routing information to the at least one other network element operating in accordance with the communication protocol. In FIG. 2, the means for providing manually provisioned communication protocol routing data is a management and provisioning entity 22, which contains a database having routing information to, for example, an IS—IS compliant network element via non-compliant NEs. A person skilled in the communication art would appreciate that the management and provisioning entity 22 may be implemented in hardware, software, or a combination thereof. A person skilled in the communication art would appreciate that a typical software embodiment for the means 22 may include a microprocessor based architecture having among other things a microprocessor, a random access memory (RAM), a read only memory (ROM), input/output circuits (I/O) and a bus connecting the aforementioned.

The network element 20 also includes means, generally indicated as 24, for periodically generating a check signal to another network element of the first type that uses manually provisioned routing information to reach the another network element of the first type having a node-element destination of the at least one other network element operating in accordance with the communication protocol to the network 100. The means 24 may have a timer which may be implemented in hardware, software, or a combination thereof, as a person skilled in the art would appreciate. Moreover, the scope of the invention is intended to cover embodiments in which the management and provisioning entity 22 may also provide a control signal to the means 24 to provide the periodically generated check signal.

The network element 20 also includes means, generally indicated as 26, that receives an acknowledge signal from the another network element of the first type, and if the acknowledge signal is received, validating the manually provisioned routing information, and if the acknowledge signal is not received, invalidating the manually provisioned routing information. The management and provisioning entity 22 may process the acknowledge signal to determine the validity of manually provisioned information for managing the database having the routing information to the IS—IS compliant network element via non-compliant NEs.

The scope of the invention is not intended to be limited to any particular means for determining the validity of manually provisioned information. For example, in FIG. 2 either the management and provisioning entity 22 or the means 24 may determine the validity of manually provisioned information and may do so using hardware, software, or a combination thereof.

The network element 20 also includes means, generally indicated as 28, that receives a check signal from another network element of the first type that uses manually provisioned routing information to reach the another network element of the first type. The management and provisioning entity 22 may also process the received check status signal for managing the database having the routing information to the IS—IS compliant network element via non-compliant NEs.

The network element 20 also includes means, generally indicated as 30, for generating an acknowledge signal if the first type of network element receives a check signal from another network element of the first type, the acknowledge signal being directed to the network element that generated the check signal. The management and provisioning entity 22 may also process the generated acknowledge signal for managing the database having the routing information to the IS—IS compliant network element via non-compliant NEs. The management and provisioning entity 22 may also provide a control signal to the means 30 to provide the generated acknowledge signal.

The scope of the invention is not intended to be limited to any particular embodiment of the means 24, 26, 28, 30. For example, a person skilled in the communication art would appreciate that the means 24, 26, 28, 30 may be implemented in hardware, software, or a combination thereof. A person skilled in the communication art would also appreciate that a typical software embodiment may include a microprocessor based architecture having among other things a microprocessor, a random access memory (RAM), a read only memory (ROM), input/output circuits (I/O) and a bus connecting the aforementioned.

In the embodiment shown and described herein, the network 100 is a connectionless network (CLNP) and Intermediate System to Intermediate System (IS—IS). As a person skilled in the communication art would appreciate the CLNP and IS—IS are known in the art. The CLNP and IS—IS are part of an Open System Interconnection (OSI) stack, and the communication protocol is the IS—IS protocol, which are both known in the art.

Figure 3:
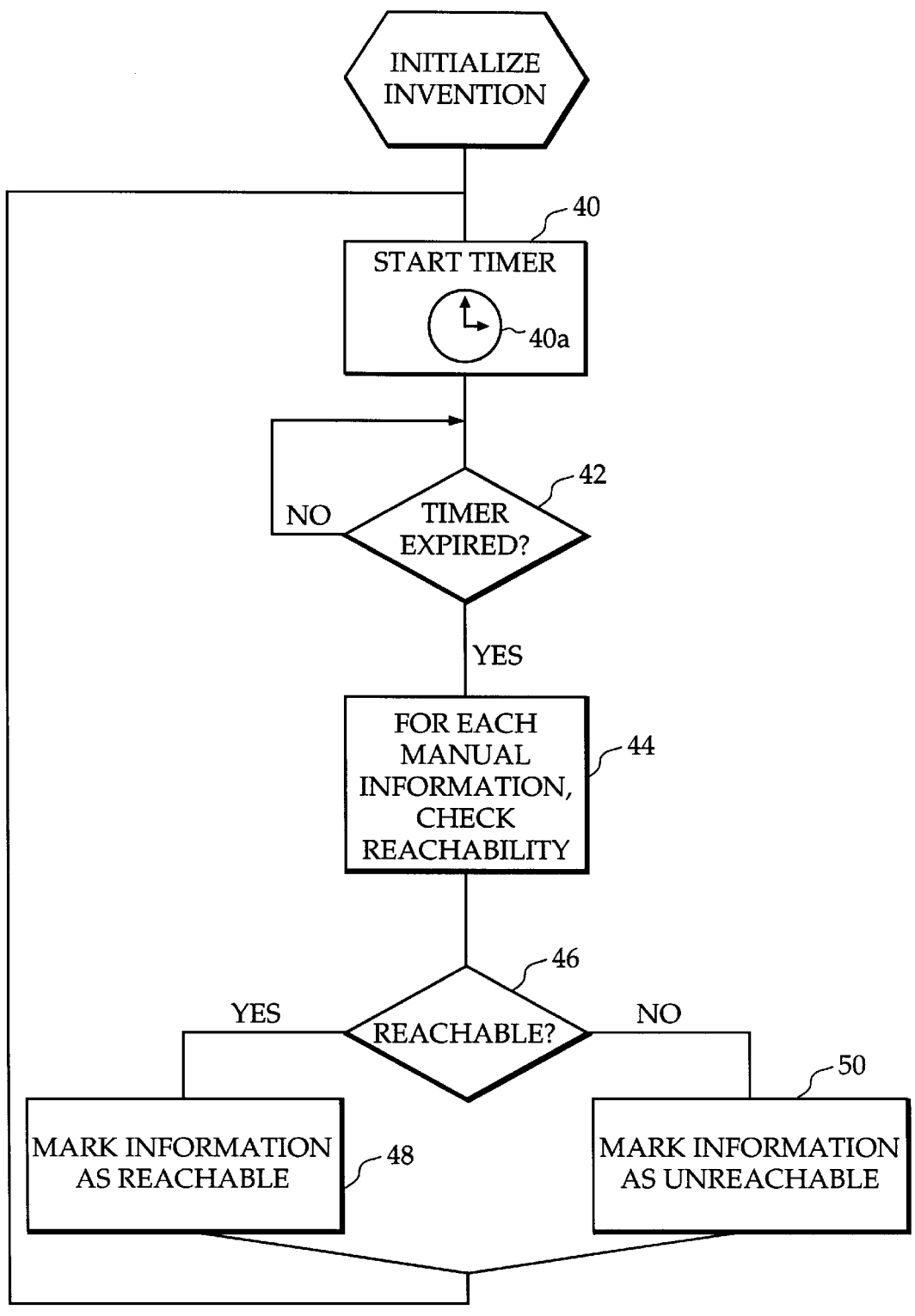
FIG. 3 is a flowchart of operation.

As shown in FIG. 3, the present invention also features a method for periodically verifying manually provisioned IS—IS routing data in a network having network elements using an Intermediate System to Intermediate System (IS—IS) protocol and having at least one network element not using the Intermediate System to Intermediate System (IS—IS) protocol.

The method includes the following steps: (a) a step 40 for starting a timer 40*a*; (b) a step 42 for checking if the timer has expired; (c) a step 44 for checking the reachability of each manually provisioned IS—IS routing data; (d) a decision step 46 if the manually provisioned IS—IS routing data is reachable, then a step 48 for marking the manually provisioned IS—IS routing data as reachable manually provisioned IS—IS routing data, else if the manually provisioned IS—IS routing data is not reachable, then a step 50 for marking the manually provisioned IS—IS routing data as non-reachable manually provisioned IS—IS routing data.

As discussed above, the timer may be implemented in either hardware, software, or a combination thereof, as a person skilled in the art would appreciate, and may also be implemented in either the means 24 or the management and provisioning entity means 20.

In the method, steps 40, 42, 44, 46, 48, 50 may be repeated for each manually provisioned IS—IS routing data.

In the method, step 50 may also include automatically deleting the manually provisioned IS—IS routing data if the manually provisioned IS—IS routing data is not reachable.

In the method, the step 50 may also include raising an optional alarm for a management entity (not shown) if the manually provisioned IS—IS routing data is not reachable.

It is important to note that the present invention may generate some undesirable background traffic in the network 100, which can easily be controlled.

Although the present invention has been described and discussed herein with respect to at least one embodiment, other arrangements or configurations may also be used that do not depart from the spirit and scope of the invention.

What is claimed is:

1. A network element of a first type using a routing protocol for operating in a network using the routing protocol and including other network elements of such first type and for allowing said other network elements to form part of the network that are not using the routing protocol of the network element of the first type, each said first type of network element having the ability to automatically determine the topology of the network for each network element of such first type and further having the ability to store manually provisioned routing information about said network elements not of said first type when said network elements not of the first type are in the path to a network element of the first type, wherein each network element of the first type further comprises a means for periodically checking the validity of manually provisioned routing information.

2. A network element of a first type as defined in claim 1, wherein said means for periodically checking the validity of manually provisioned routing information includes:

means for periodically generating a check signal to another network element of the first type that uses manually provisioned routing information to reach said another network element of the first type.

3. A network element of a first type as defined in claim 2, wherein said means for periodically checking the validity of manually provisioned routing information includes:

means for receiving an acknowledge signal from said another network element of the first type, and if said acknowledge signal is received, validating the manually provisioned routing information, and if said acknowledge signal is not received, invalidating the manually provisioned routing information.

4. A network element of a first type as defined in claim 3, wherein said means for periodically checking the validity of manually provisioned routing information includes:

means for generating an acknowledge signal if said first type of network element receives a check signal from another network element of the first type, said acknowledge signal being directed to the network element that generated the check signal.

5. A network element of a first type as defined in claim 4, wherein said means for periodically checking the validity of manually provisioned routing information includes:

means for receiving a check signal from said another network element of the first type, and if said acknowledge signal is received, validating the manually provisioned routing information, and if said acknowledge signal is not received, invalidating the manually provisioned routing information.

6. A network element of a first type as defined in claim 1, wherein said means for periodically checking the validity of manually provisioned routing information includes:

means for receiving an acknowledge signal from said another network element of the first type, and if said acknowledge signal is received, validating the manually provisioned routing information, and if said acknowledge signal is not received, invalidating the manually provisioned routing information.

7. A network element of a first type as defined in claim 1, wherein said means for periodically checking the validity of manually provisioned routing information includes:

means for generating an acknowledge signal if said first type of network element receives a check signal from another network element of the first type, said acknowledge signal being directed to the network element that generated the check signal.

8. A network element of a first type as defined in claim 1, wherein said means for periodically checking the validity of manually provisioned routing information includes:

means for receiving a check signal from said another network element of the first type, and if said acknowledge signal is received, validating the manually provisioned routing information, and if said acknowledge signal is not received, invalidating the manually provisioned routing information.

9. A network element of a first type as defined in claim 1, wherein the manually provisioned information signal contains manually provisioned communication protocol routing information signal.

10. A network element of a first type as defined in claim 1, wherein the network is a connectionless network (CLNP) and Intermediate System to Intermediate System (IS—IS).

11. A network element of a first type as defined in claim 1, wherein the connectionless network (CLNP) and Intermediate System to Intermediate System (IS—IS) is part of an Open System Interconnection (OSI) stack; and wherein the communication protocol is an Intermediate System to Intermediate System (IS—IS) protocol.

12. A network element of a first type as defined in claim 1, wherein the network includes a management and provisioning entity that can process the acknowledge signal for managing a database having routing information to an IS—IS compliant network element via non-compliant network elements.

13. A method for periodically verifying manually provisioned IS—IS routing data in a network having network elements using an Intermediate System to Intermediate System (IS—IS) protocol and having at least one network element not using the Intermediate System to Intermediate System (IS—IS) protocol for which manually provisioned IS—IS routing data is maintained by at least one network element using the IS—Is protocol, comprising the steps of:

(a) starting a timer;

(b) checking if the timer has expired;

(c) checking the reachability of manually provisioned IS—IS routing data;

(d) if the manually provisioned IS—IS routing data is reachable, then marking the manually provisioned IS—IS routing data as reachable manually provisioned IS—IS routing data; and (e) if the manually provisioned IS—IS routing data is not reachable, then marking the manually provisioned IS—IS routing data as non-reachable manually provisioned IS—IS routing data.

14. A method according to claim 13, wherein steps (a) through (e) are repeated for each manually provisioned IS—IS routing data.

15. A method according to claim 13, wherein step (e) includes automatically deleting the manually provisioned IS—IS routing data signal if the network element relating to the manually provisioned IS—IS routing data signal is not reachable.

16. A method according to claim 13, wherein step (e) includes raising an optional alarm for a management entity if the network element relating to the manually provisioned IS—IS routing data signal is not reachable.

17. A method according to claim 13, wherein step (e) includes remapping a connection between the network elements using an Intermediate System to Intermediate System (IS—IS) protocol if the network element relating to the manually provisioned IS—IS routing data signal is not reachable.

* * * * *